(12) United States Patent
Sümmermann

(10) Patent No.: US 12,023,866 B2
(45) Date of Patent: Jul. 2, 2024

(54) WORKPIECE CLEANING DEVICE, CLEANING PROCESS AND MANUFACTURING PROCESS

(71) Applicant: Volkmann GmbH, Soest (DE)

(72) Inventor: Konrad Sümmermann, Soest (DE)

(73) Assignee: Volkmann GMBH (DE)

( * ) Notice: Subject to any disclaimer, the term of this patent is extended or adjusted under 35 U.S.C. 154(b) by 0 days.

(21) Appl. No.: 17/719,852

(22) Filed: Apr. 13, 2022

(65) Prior Publication Data

US 2022/0324172 A1  Oct. 13, 2022

(51) Int. Cl.
*B29C 64/35* (2017.01)
*B08B 5/02* (2006.01)
*B08B 7/02* (2006.01)
*B08B 7/04* (2006.01)
*B08B 13/00* (2006.01)
(Continued)

(52) U.S. Cl.
CPC .............. *B29C 64/35* (2017.08); *B08B 5/023* (2013.01); *B08B 7/02* (2013.01); *B08B 7/04* (2013.01); *B08B 13/00* (2013.01); *B22F 10/68* (2021.01); *B33Y 40/20* (2020.01)

(58) Field of Classification Search
None
See application file for complete search history.

(56) References Cited

PUBLICATIONS

DE 102018118067 A1 translation, Cleaning device, Genze Alexander (Year: 2020).*

* cited by examiner

*Primary Examiner* — Cristi J Tate-Sims

(74) *Attorney, Agent, or Firm* — UB Greensfelder LLP; Brian Erkin Turung

(57) ABSTRACT

The invention relates to a device for cleaning a workpiece produced by means of additive production from a granular and/or powdery production material and/or for removing excess granular and/or powdery production material after additive workpiece production. The device comprises a housing in which a workpiece mounting is arranged on which or on which the produced workpiece can be arranged. In or on the housing at least one conveyor is arranged to convey, in particular, excess production material, away from the housing interior. At least one movable nozzle is arranged on at least one movable nozzle arm in the housing interior, such that the workpiece and the housing interior can be acted upon by at least one flow of the cleaning fluid during a cleaning cycle in which the workpiece and/or housing interior are purged of, in particular, excess production material. At least one nozzle rotation is provided, in which the nozzle can be rotated about at least one nozzle rotation axis relative to the nozzle arm. At least one arm trajectory movement and/or at least one arm rotation is provided, in which the nozzle arm can be moved and/or rotated relative to the workpiece mounting along at least one arm trajectory and/or about at least one arm rotation axis. The rotational speed of the nozzle rotation and the speed of the arm movement and/or the arm rotation are constituted such that during a cleaning cycle the flow of the cleaning fluid assumes all, or almost all, flow directions within the housing interior, such that the whole surface, or almost the whole surface, of the workpiece and of the housing interior, can be exposed to the cleaning flow from all, or almost all, directions.

17 Claims, 4 Drawing Sheets

Figure 1:
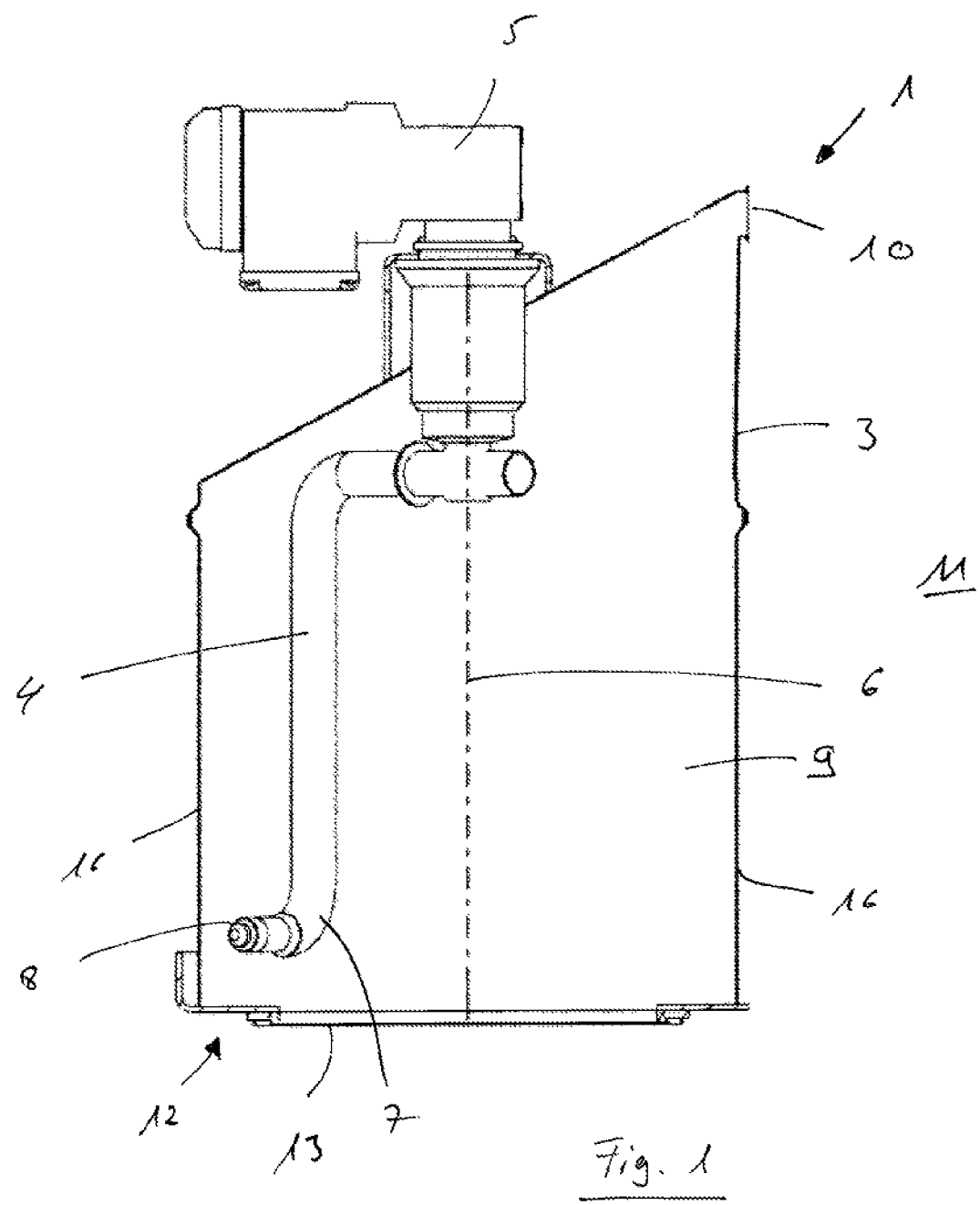

(51) Int. Cl.
*B22F 10/68* (2021.01)
*B33Y 40/20* (2020.01)

WORKPIECE CLEANING DEVICE, CLEANING PROCESS AND MANUFACTURING PROCESS

FIELD OF THE INVENTION

The invention relates to a cleaning device according to the preamble of claim 1. The device is for the cleaning of a workpiece produced by means of additive production from a granular and/or powdery production material, and/or for the removal of excess granular and/or powdery production material after an additive workpiece production. In this respect, the device can be constituted as a powder removal device. The production material can be a plastic or metal powder or granulate. The cleaning device can be integrated in a workpiece production facility (3D-printer), or can be capable of integration therein, or can be a component of a 3D-workpiece production line constituted from a plurality of components. The device comprises a housing, in particular a housing impermeable to fluids, in which a workpiece mounting is arranged, on which the produced (printed) workpiece can be arranged. The workpiece mounting can, for example, be constituted as a build frame, or as a (fluid-impermeable) build chamber for the workpiece. At least one conveyor is arranged in or on the housing, to convey, in particular, excess production material, away from the housing interior. At least one movable nozzle is arranged in the housing interior, on at least one movable nozzle arm. The workpiece and the housing interior can be subjected to at least one flow of the cleaning fluid during a cleaning cycle, in which the workpiece and/or the housing interior are purged of, in particular, excess production material.

The invention also relates to a cleaning method according to the preamble of claim 16 and a workpiece production method according to the preamble of claim 17.

TECHNOLOGICAL BACKGROUND

Additive production methods are becoming increasingly relevant, in particular in industrial production. The production resource, or the production material, is usually granular or powdery, and a 3-dimensional workpiece is produced from the granular or powdery material in a production method. After production, either secondary treatment, or a further treatment, or a use of the workpiece is intended. Before this, the workpiece is to be purged of powder residues. This can take place in an air or gas stream. A possible contamination of the environment of the air/gas cleaning as well as the quality of the cleaning are problematic: not all surface elements of the workpiece are always exposed to the air/gas flow, and residues of the production material remain on the workpiece after the cleaning process. It has therefore proved to be useful to direct the workpiece to a powder removal process, which takes place in a sealed container. However, this is time-consuming and cost-intensive.

PRESENTATION OF THE INVENTION

Against this background, the object of the invention is to specify measures with which the cleaning of an additively manufactured workpiece from production material residues can be achieved efficiently, and in a cost- and time-saving manner. This object is achieved by means of a cleaning device according to claim 1. Further configurations of the invention ensue from the independent claims and subsidiary claims. In the cleaning device according to claim 1, at least one nozzle rotation is provided, in which the nozzle can be rotated, about at least one axis of nozzle rotation, relative to the nozzle arm. Provision is furthermore made for at least one arm movement, and/or at least arm rotation, whereby the nozzle arm can be moved and/or rotated about at least along one arm trajectory, and/or about at least one axis of arm rotation relative to the workpiece mounting. The orientations of the axis of nozzle rotation and the axis of arm rotation can differ. For example, the nozzle rotation axis can be at right angles to, or almost at right angles to, the axis of nozzle arm rotation. Here the rotational speeds of the nozzle rotation, and the speed of the arm movement, and/or the arm rotation, are constituted such that during a cleaning cycle the flow of the cleaning fluid assumes all, or almost all, flow directions within the housing interior, such that the cleaning flow can impinge on the whole surface, or almost the whole surface, of the workpiece, and the housing interior, from all, or almost all, directions. A cleaning cycle is approximately the time period in which the workpiece is sufficiently cleaned, that is to say, powder removal is effected. As the cleaning fluid is also applied directly to the housing interior, dustback, that is to say, contamination of the workpiece by powder residues in the housing interior, is avoided. These powder residues can be deposited there by the cleaning process itself, or by a previous cleaning process. In particular, the device as described prevents the residues from the cleaning of a first workpiece from contaminating a second workpiece that is to be cleaned subsequently. In that the nozzle rotates, as does the arm, on which the nozzle is arranged, the vector space of all cleaning fluid flow vectors during a cleaning cycle encompasses the full solid angle ($4\pi$), or almost the full solid angle ($\approx 4\pi$), where a solid angle is a mathematically describable fraction of the whole three-dimensional space. It can be expedient if a device is provided for the introduction of the workpiece into the cleaning device, in order to avoid contamination of the environment of the cleaning device.

The arm movement, and/or the arm rotation, preferably causes the rotating nozzle to move along a round, circular, oval, rectangular, or almost rectangular, or free-form, trajectory about the workpiece mounting, and between the workpiece mounting and the housing wall. The trajectory can, for example, be rectangular with rounded corners. In particular, in the case of a rectangular frame, the nozzle arm essentially follows the shape of the frame. For this purpose, an appropriate gearing mechanism can be provided, which is arranged along the arm trajectory. Depending on the configuration of the device, the frame, and thus the arm trajectory, can be of variable length. The nozzle arm of the device thus moves the rotating nozzle about the workpiece, or about the workpiece mounting, along a trajectory. In that the nozzle arm rotates, as does the nozzle itself, all, or almost all, surface elements of the workpiece are exposed to the fluid flow. This has the effect that all, or almost all, production material or powder residues on the workpiece, and on the housing wall, are captured by the fluid flow, and at least removed from the workpiece. After just one cleaning cycle, the powder is removed from the workpiece and the latter can be directed onwards to further processing or recycling.

In that the nozzle and the nozzle arm rotate in the manner as described, not only is the workpiece purged of production material residues or contaminants, but so is the cleaning device itself, that is to say, the housing interior of the device. This aspect of the cleaning process is of considerable importance for the cleaning result, in that it prevents recontamination of the workpiece during a cleaning cycle, which is to be traced back to the fact that production material residues on the housing interior contaminate the workpiece placed therein during the cleaning process. In addition, "cross-contamination" can be avoided, that is to say, contamination by production material contaminants from a first workpiece, created during a first cleaning cycle, and capable of contaminating a second workpiece, which is located in a subsequent, second cleaning cycle.

The nozzle rotation and the arm movement and/or arm rotation can preferably be coupled. During one revolution of the arm rotation, an adjustable constant, or an adjustable variable, or a non-adjustable variable, or any desired, number of revolutions, of the nozzle rotation occurs. For example, the nozzle can make x nozzle revolutions during one arm revolution, where x can be a natural number, in particular greater than 1, (x☐N), or a rational number, in particular greater than 1, (x☐Q). If x is a non-integer number, the position of the nozzle alters after each full arm revolution, such that the flow of the cleaning fluid leaving the nozzle has a different direction after each arm revolution, such that it is applied onto each, or almost each, surface element of the workpiece and the housing interior. Alternatively, during one revolution of the nozzle rotation, an adjustable constant, or an adjustable alterable, or a non-adjustable variable, or any desired, number of revolutions of the arm rotation can take place. Thus, for example, during one revolution of the nozzle, y arm revolutions can be provided (y☐N or y☐Q).

The position of the nozzle on the nozzle arm after one revolution of the nozzle arm preferably has a small (angular) offset compared to its position before the nozzle arm revolution, as a result of which a large angular range of flow directions of the flow of the cleaning fluid is covered by a plurality of revolutions.

By virtue of the rotational configuration as described herein, the fluid is applied onto the workpiece from a multiplicity of directions, in particular from all directions, and the workpiece is thus cleaned efficiently and thoroughly in a particularly short time. The coupling between nozzle rotation and arm rotation can also be chaotic, that is to say, disordered or non-deterministic, such that the nozzle "whirls" about the axis of nozzle rotation, as it were, while the nozzle arm rotates about the axis of arm rotation at a comparatively constant or, in particular, a variably determinable, rotational speed. During the rotation of the nozzle and/or arm, at least one reversal of direction of one or both directions of rotation (nozzle/arm) can be provided during a cleaning cycle.

Provision can be made for the coupling of the nozzle rotation and arm movement, and/or arm rotations, to take place mechanically and/or electronically, in particular by means of a control device. At least one gearing mechanism can be arranged on or in the nozzle arm, which converts the movement of the nozzle arm into a movement of the nozzle. The nozzle arm can be driven by a, preferably controllable, (arm) motor. The rotation of the nozzle can be driven by the nozzle arm motor by means of a gearing mechanism, or by a separate (nozzle) motor. The rotation of the nozzle can also be effected by (fluid-mechanical) forces, as formed by the flow of the cleaning fluid.

The nozzle can be constituted as a dual, or a multiple, nozzle. For example, a dual nozzle can be provided at one end of the nozzle arm, which generates a first fluid flow on one side of the arm, and a second flow on the opposite side. The directions of the flows can be different, in particular they can be varied differently. With dual or multiple nozzles, even more fluid flow directions are generated, which optimises, in particular accelerates, the powder removal.

The angle, or angles, at which the flow of the cleaning fluid leaves the nozzle, can be set or adjusted by means of the nozzle, in particular by altering the angle between the rotatable nozzle and the rotatable, and/or movable, nozzle arm.

In accordance with one variant of the cleaning device, provision can be made for the workpiece mounting to be movable, in particular displaceable, and/or pivotable, and/or rotatable, within the housing. Furthermore, a workpiece actuator can be provided, with which the workpiece can be moved in or on the workpiece mounting during a cleaning cycle, in particular can be moved incrementally. In this manner, the cleaning fluid is applied onto the workpiece at least once at every position (for example, at every 'height' when the workpiece is displaced vertically) and at every (spatial) angle. This increases the cleaning efficiency and means that the cleaning cycle takes less time. Thus, more workpieces can be cleaned per unit of time. A linear displacement of the nozzle arm can also be provided.

The cleaning fluid is preferably a gas, or a gas mixture, and in particular comprises an inert gas. The gas pressure can be alterable, that is to say, the flow velocity of the cleaning fluid can be adapted to the workpiece size or geometry. A solid or a liquid cleaning fluid can also be provided, such as a liquid, or a particle stream.

It is expedient if the conveyor for removing the production material residues is constituted as a vacuum conveyor. Since the cleaning fluid can form an overpressure in the fluid-impermeable housing interior, a pressure equalisation is brought about by vacuum conveyancing.

The conveyor can be connected fluidically to a conveyancing port, which is arranged such that the granular and/or powdery production material to be removed, in particular the excess material, flows by virtue of gravity in the direction of the conveyancing port. In order to avoid a fluid bottleneck, or a blockage of the port, or the channels or lines arranged thereon, a fluid flow monitoring device can be provided, which in particular is arranged in the region of the conveyancing port.

In particular, in order to support the gravity-assisted removal of the (excess) production material, provision can be made for the position of the cleaning device to be alterable, in particular to be displaceable, rotatable, and/or pivotable. In this manner, it can be achieved that the (excess) production material falls downwards and towards the port of the (vacuum) conveyor.

In order for the device to be integrated into a production process in as uncomplicated a manner as possible, it is expedient if the cleaning device can be positioned on the workpiece mounting so as to form a fluid-impermeable volume. It is therefore not to necessary to change a workpiece mounting; rather, the workpiece mounting is constituted such that it can be used in other process stages (production, post-processing, etc.).

To improve the cleaning effect, provision can be made for a vibration device to be provided in or on the device, with which the device, and/or the workpiece mounting, and/or the workpiece, can be exposed to at least one vibration. The vibration can be modulated in terms of amplitude and/or frequency. Frequency modulation can be provided, in which at least one natural or resonant frequency of the component is included.

An efficient, and cost- and time-saving, purging of production material residues from an additively manufactured workpiece is further achieved with a cleaning method according to claim 16. In the method, provision is made for the workpiece to be arranged in a cleaning device, in particular in a cleaning device as described herein. During a cleaning cycle, in which the workpiece and/or the housing interior are purged of, in particular, excess production material, the cleaning fluid, which flows out of at least one movable nozzle, arranged on at least one movable nozzle arm, is applied onto the workpiece. The workpiece and the housing interior of the device are exposed to at least one flow of the cleaning fluid during a cleaning cycle. Here at least one nozzle rotation is provided, in which the at least one nozzle rotates about at least one axis of nozzle rotation relative to the nozzle arm, together with at least one arm movement, and/or arm rotation, in which the nozzle arm moves along at least one arm trajectory relative to the workpiece mounting, and/or rotates about at least one axis of arm rotation relative to the workpiece mounting. The orientations of the axis of nozzle rotation and the axis of arm rotation can differ. The rotational speeds of the nozzle rotation and the speed of the arm movement, and/or the arm rotation, are constituted such that during a cleaning cycle the flow of the cleaning fluid assumes all, or almost all, flow directions within the housing interior, such that the whole surface, or almost the whole surface, of the workpiece and the housing interior are exposed to the cleaning flow.

An efficient, and cost- and time-saving, cleaning of an additively manufactured workpiece from production material residues, is further achieved with an additive production method according to claim 17. In the method, a workpiece is produced from a granular and/or powdered production material and is subsequently cleaned according to a cleaning method as described herein.

The above-mentioned components, together with the components claimed and described in the examples of embodiment to be used in accordance with the invention, are not subject to any particular exceptional conditions with regard to their size, configuration, material selection, and technical conception, such that the selection criteria of known art in the field of application can be applied without restriction.

Further details, features and advantages of the subject matter of the invention ensue from the subsidiary claims, as well as from the following description and the accompanying drawings, in which—by way of example—an embodiment of a powder removal device is shown. Individual features of the claims or the forms of embodiment can also be combined with other features of other claims and forms of embodiment.

SHORT DESCRIPTION OF THE FIGURES

Figure 2A:
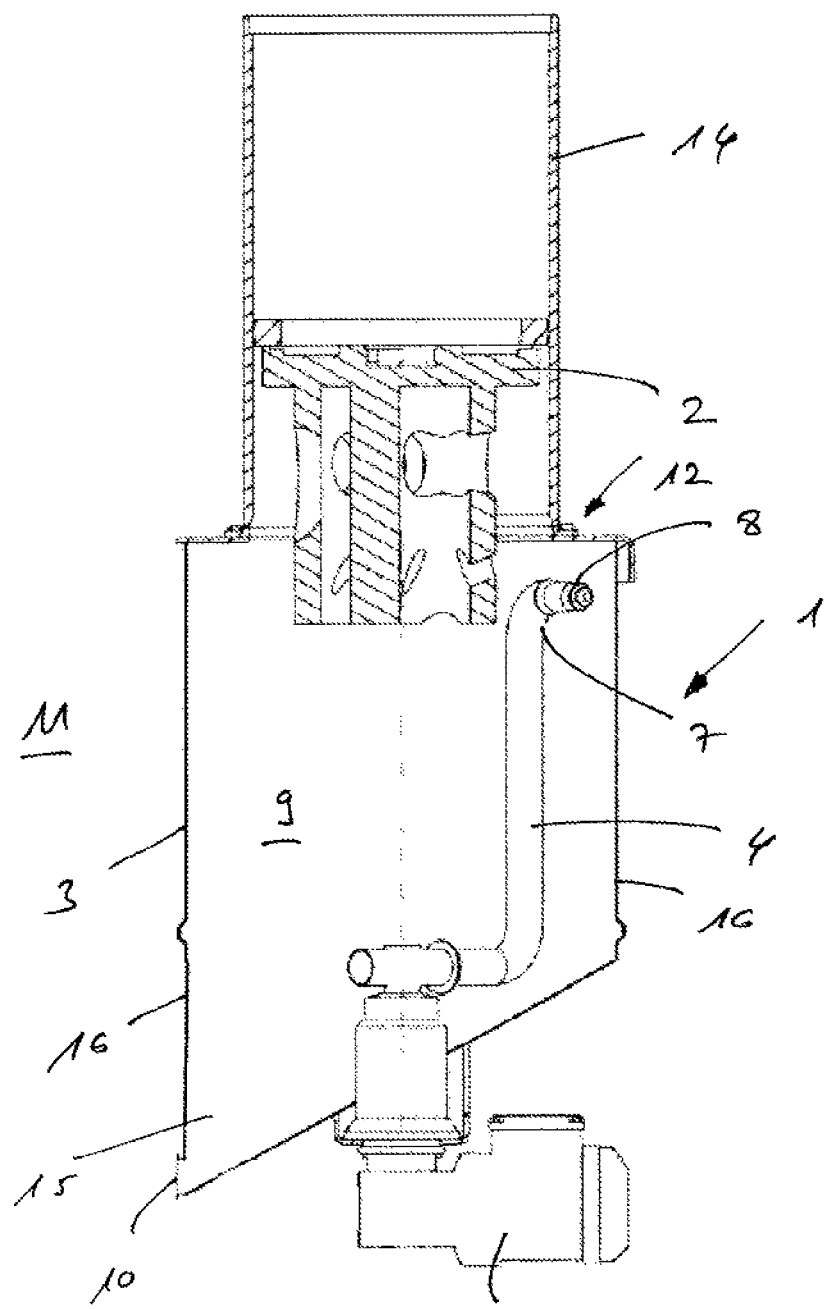
Figure 3:
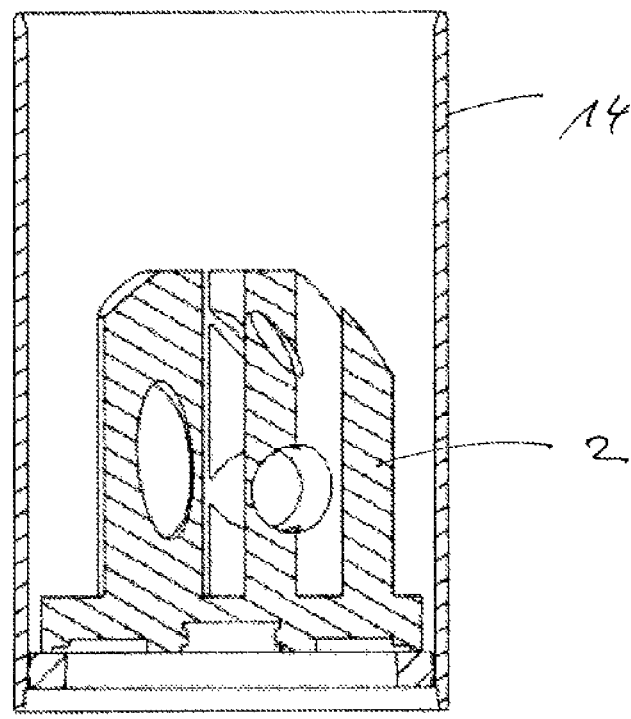
Figure 4:
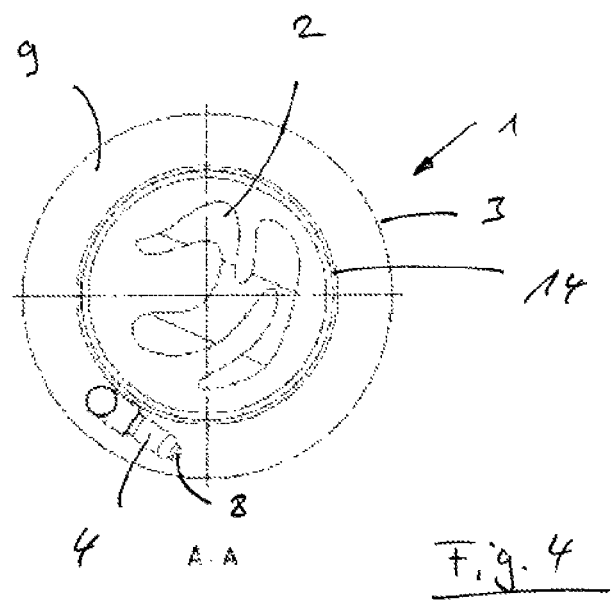

In the drawings:

FIG. 1 shows a cleaning device in a schematic side view,

FIGS. 2A/B show a cleaning device with a build chamber and a workpiece in differing schematic side views, FIG. 3 shows a build chamber with a workpiece in a schematic side view, and FIG. 4 shows a cleaning device in a schematic sectional view (plan view).

DETAILED DESCRIPTION OF EXAMPLES OF EMBODIMENT

FIG. 1 shows a schematic side view of a cleaning device 1, or a powder removal module, for the removal of powder from an additively produced workpiece (2). A nozzle arm 4 is arranged in the housing 3 of the device 1, which arm can be rotated about the axis of nozzle arm rotation 6, by way of a nozzle arm drive 5. A bend 7 is provided at the end of the nozzle arm 4, on which is arranged a rotatable nozzle 8. A cleaning fluid, such as a gas, or a gas mixture, flows out of the nozzle 8 into the housing interior 9. The fluid flow removes production material residues from a workpiece (2), which can be inserted into the device 1 shown in FIG. 1. The production material residues are sucked out of the housing interior 9, for which purpose a conveyancing port 10 is provided, onto which a vacuum conveyancing system can be fluidically arranged. Furthermore, the housing interior 9 is impermeable to fluids, such that no production material residues can escape into the environment 11 of the powder removal device 1.

The housing 3 can have a cylindrical geometry, that is to say, the housing cross-section can be round, which becomes clear from the view according to FIG. 4. An opening 13, or a possible connection for a port, or for a build chamber (14) can be provided on an end face 12 of the housing 3, through which the workpiece to be cleaned can be brought into the interior 9 of the housing.

Figure 2B:
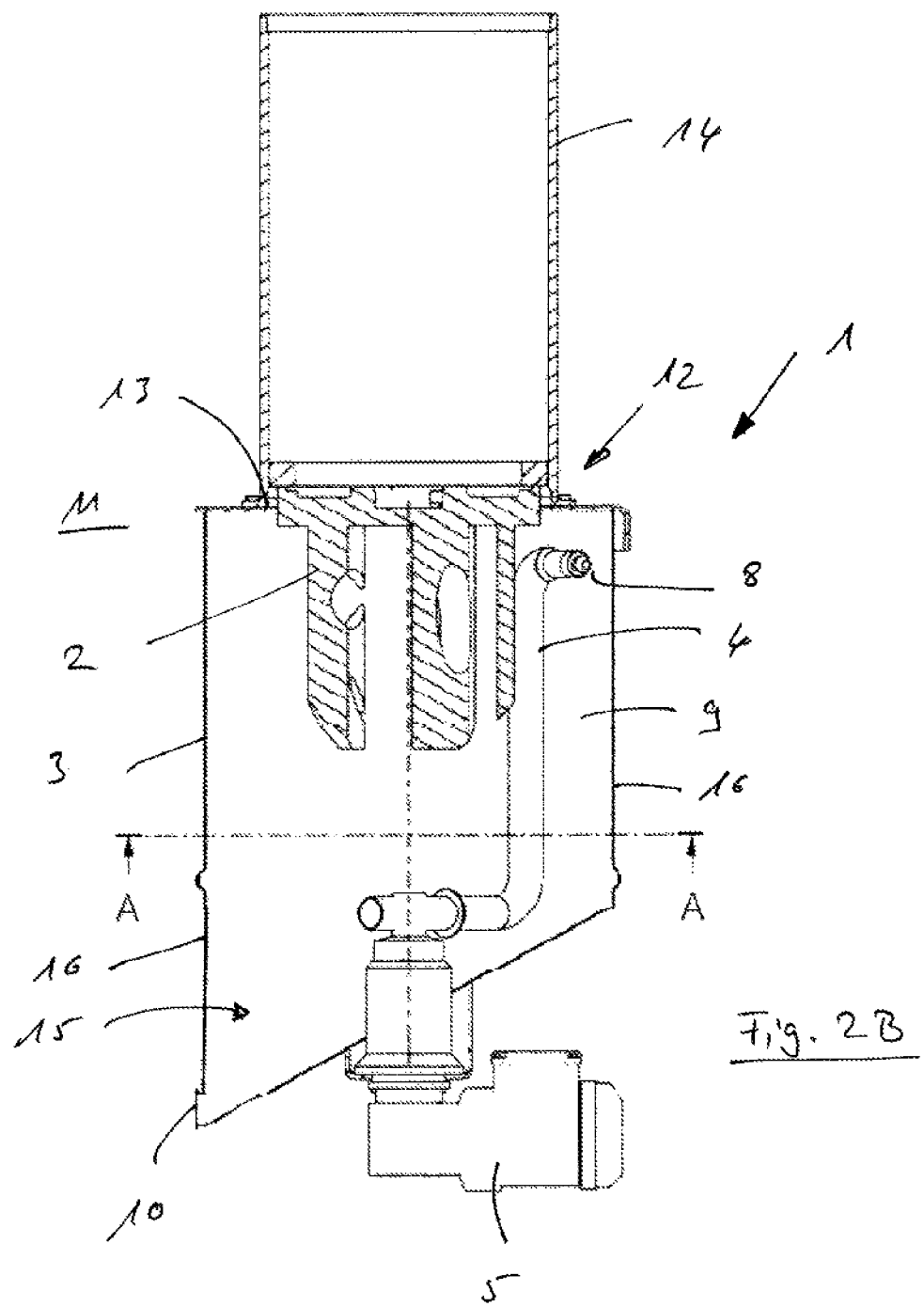

FIGS. 2A and 2B show a powder removal module 1 on which is arranged a workpiece mounting 14, in which a workpiece 2 to be cleaned is arranged. The workpiece mounting 14 is shown in FIG. 3. The workpiece 2 has previously been manufactured from a production material by means of additive production. Due to the method of production, production material residues adhere to the workpiece 2. Cleaning of the workpiece 2 in the cleaning device 1 removes these production material residues. The workpiece mounting 14 forms a build chamber, which is connected to the housing 3 of the cleaning device 1 such that the volume of the build chamber 14 and the housing interior 9 are connected to each other in a manner impermeable to fluids. In principle, the cleaning device 1 can be positioned on, or set on top of, the build chamber 14.

The workpiece 2 can be linearly displaced within the workpiece mounting 14 along the direction of the axis of rotation 6, which is made clear by a comparative study of FIGS. 2A and 2B. Provision can be made for the mounting 14 (build plate) to be moved back and forth during the powder removal process. In FIG. 2A the workpiece 2 is located partially within the housing interior 9; in FIG. 2B the workpiece 2 to be cleaned is located wholly within the housing interior 9.

The workpiece 2 is cleaned by guiding the nozzle arm 4 with the rotating nozzle 8, out of which the cleaning fluid flows, around the workpiece 2 by rotation about the axis of nozzle arm rotation 6. During these rotations (of the arm 4 and nozzle 8), the workpiece 2 is moved linearly, for example with an actuator that effects an incremental displacement of the workpiece 2. In this manner, each surface element of the workpiece 2 to be cleaned is exposed to a flow of fluid during a cleaning cycle. During a cleaning cycle, the nozzle arm 4 makes a plurality of revolutions around the workpiece 2, and the nozzle 8 makes a plurality or multiplicity of revolutions about the axis of nozzle rotation, per revolution of the nozzle arm. The axis of nozzle rotation stands almost at right angles to the axis of nozzle arm rotation 6. The angle at which the fluid leaves the nozzle 8 can be altered, by the pivoting or adjustment of the nozzle 8. At the position where the fluid is applied to the workpiece 2, excess production material adhering to the workpiece 2 is removed, and enters the housing interior 9 of the cleaning device 1. From there it is removed from the housing interior 9 by a vacuum conveyancing system.

To ensure that the excess production material that is to be removed is extracted efficiently, the port 10 of the vacuum conveyor is located in a depression 15 of the housing 3. By virtue of gravity, the production material residues fall in the direction of the conveyancing port 10 of the vacuum conveyor. This is facilitated by the funnel shape of the housing end face.

By providing at least two axes of rotation during the movement of the nozzle 8, not only is the cleaning fluid applied to the workpiece 2, but also to the housing wall 16 of the housing interior 9. In this manner, the housing interior 9 is also purged of production material residues. On the one hand, this prevents dust from returning to the workpiece 2, and on the other hand, it prevents cross-contamination with the cleaning of a first workpiece 2 made of a first production material, and the subsequent cleaning of a second workpiece 2 made of a second production material that differs from the first.

LIST OF REFERENCE SYMBOLS

1 Cleaning device/powder removal module
2 Workpiece
3 Housing
4 Nozzle arm
5 Nozzle arm drive
6 Axis of nozzle arm rotation
7 Bend
8 Nozzle
9 Housing interior
10 Conveyancing port
11 Environment
12 End face
13 Opening
14 Workpiece mounting/build chamber
15 Depression
16 Housing wall

The invention claimed is:

1. A cleaning device for a) cleaning a workpiece produced by means of additive production from a granular and/or powdery production material, and/or b) removal of excess granular and/or powdery production material after additive workpiece production; said cleaning device comprises:
   a housing; said housing includes a workpiece mounting on which or onto which the produced workpiece can be arranged;
   a conveyor arrangement that is arranged in or on said housing to allow excess production material to be removed or conveyed away from an interior of said housing;
   a movable nozzle arm; said movable nozzle arm is movable within said housing; at least a portion of said movable nozzle arm is configured to move about an outer perimeter of the workpiece during a cleaning cycle;
   a movable nozzle that is arranged in said housing interior and is connected to said movable nozzle arm; said movable nozzle is positioned in said housing interior such that the workpiece and said housing interior are exposed to a flow of cleaning fluid during said cleaning cycle such that the workpiece and/or said housing interior are purged of excess production material;
   a nozzle rotation arrangement; said movable nozzle is rotatably connected to said nozzle rotation arrangement said movable nozzle is configured to be rotated about at least one axis of said nozzle rotation arrangement relative to said movable nozzle arm; and
   an arm trajectory movement arrangement that is connected to said movable nozzle arm; said movable nozzle arm is movable relative to said workpiece mounting along said arm trajectory arrangement; and
   wherein a rotational speed of said nozzle rotation arrangement and a speed of movement and rotation of said movable nozzle arm are such that during a cleaning cycle said flow of cleaning fluid during said cleaning cycle assumes all or almost all flow directions within said housing interior such that a whole surface, or almost a whole surface of the workpiece and said housing interior is exposed to said flow of cleaning from all or almost all directions; and
   wherein said workpiece mounting is moveable relative to said housing such that the workpiece is movable within said housing and moves relative to said movable nozzle as said movable nozzle rotates about the workpiece during said cleaning cycle.

2. The cleaning device according to claim 1, wherein an angle of said movable nozzle to said movable nozzle arm is adjustable such that a flow direction of said cleaning fluid that leaves said movable nozzle is adjustable.

3. The cleaning device according to claim 1, wherein said workpiece mounting is movable to cause the workpiece to move along a longitudinal axis of said housing.

4. The cleaning device according to claim 1, further including a workpiece actuator; said workpiece actuator is configured to move said workpiece mounting incrementally such that said workpiece is incrementally moved within said housing interior during said cleaning cycle.

5. A cleaning device for cleaning material from a workpiece; said cleaning device comprises:
   a housing; said housing includes an interior chamber;
   a workpiece mounting that is configured to support the workpiece;
   a workpiece actuator that is configured to move said workpiece mounting incrementally such that the workpiece is incrementally moved within said interior chamber;
   a conveyor arrangement that is arranged in or on said housing to allow material that is cleaned from the workpiece to be removed or conveyed away from said interior chamber of said housing;
   a movable nozzle arm; said movable nozzle arm is rotatable within said interior chamber of said housing;
   an arm trajectory movement arrangement that is connected to said movable nozzle arm to cause said movable nozzle arm to move within said interior chamber of said housing and to be movable relative to said workpiece that is in said interior chamber of said housing; and
   a nozzle that connected to said movable nozzle arm; and
   wherein movement of said nozzle about the workpiece during a cleaning cycle causes cleaning fluid that is flowing from said nozzle to clean an exterior surface of the workpiece; and
   wherein said workpiece actuator is configured to cause said workpiece mounting to move to thereby cause the workpiece to move within said interior chamber of housing during said cleaning cycle.

6. The cleaning device as defined in claim 5, wherein said nozzle is connected to said movable nozzle arm such that said nozzle can be angularly adjustable relative to said movable nozzle arm.

7. A cleaning device for cleaning material from a workpiece; said cleaning device comprises:
   a housing; said housing includes an interior chamber;
   a workpiece mounting that is configured to support the workpiece;

a conveyor arrangement that is arranged in or on said housing to allow material that is cleaned from the workpiece to be removed or conveyed away from said interior chamber of said housing;

a movable nozzle arm; said movable nozzle arm is rotatable within said interior chamber of said housing;

a nozzle that connected to said movable nozzle arm;

an arm trajectory movement arrangement that is connected to said movable nozzle arm to cause a) said movable nozzle arm to move within said interior chamber of said housing and to be movable relative to said workpiece while the workpiece is located in said interior chamber of said housing, and b) said nozzle to move about an outer perimeter of the workpiece while the workpiece is located in said interior chamber of said housing as cleaning fluid is expelled from said nozzle during a cleaning cycle; and wherein movement of said nozzle about the workpiece during the cleaning cycle causes cleaning fluid that is flowing from said nozzle to clean an exterior surface of the workpiece; and wherein said movable nozzle arm has a first elbowed end section, a second elbowed end section, and a linear middle section that is connected between said first and second elbowed end sections; a portion of said first elbowed end section is connected to said arm trajectory movement arrangement; a portion of said second elbowed end section is connected to said nozzle; a longitudinal axis of said nozzle is not parallel to a longitudinal axis of said linear middle section.

8. The cleaning device as defined in claim 7, wherein said nozzle is connected to an end of said second elbowed end section.

9. The cleaning device as defined in claim 7, wherein a longitudinal length of said linear middle section is greater than a longitudinal length of each of said first and second elbowed end sections.

10. The cleaning device as defined in claim 7, further including a workpiece actuator that is configured to move said workpiece mounting within said interior chamber to thereby cause the workpiece to move within said interior chamber of housing during said cleaning cycle.

11. The cleaning device as defined in claim 7, wherein said nozzle is connected to said movable nozzle arm such that said nozzle can be angularly adjustable relative to said movable nozzle arm.

12. The cleaning device as defined in claim 7, wherein said arm trajectory movement arrangement causes said movable nozzle arm on said movable nozzle arm to move along a round, circular, oval, rectangular, or almost rectangular, or free-form, trajectory around said workpiece mounting and between said workpiece mounting and an interior surface of said interior chamber of said housing.

13. The cleaning device as defined in claim 7, wherein said nozzle is a rotating dual or multiple nozzle that is movably connected to said movable nozzle arm.

14. The cleaning device as defined in claim 7, wherein said conveyor arrangement includes a vacuum conveyor.

15. The cleaning device as defined in claim 7, wherein said conveyor arrangement is fluidically connected to a conveyancing port which is arranged such that granular and/or powdery production material that is removed from the workpiece during said cleaning cycle flows by virtue of gravity in a direction of said conveyancing port.

16. The cleaning device as defined in claim 15, further including a fluid flow monitoring device that is arranged in a region of said conveyancing port.

17. The cleaning device as defined in claim 7, further including a vibration device; said vibration device is configure to cause said workpiece mounting to be exposed to at least one vibration.

* * * * *